June 5, 1951  F. W. SAMPSON  2,555,510
STEERING WHEEL HAVING BUILT-IN ELECTRIC SWITCH
Filed May 28, 1949  2 Sheets-Sheet 1

INVENTOR
FREDERICK W. SAMPSON
BY Spencer Hardman & Fehr
HIS ATTORNEYS

June 5, 1951    F. W. SAMPSON    2,555,510
STEERING WHEEL HAVING BUILT-IN ELECTRIC SWITCH
Filed May 28, 1949    2 Sheets-Sheet 2
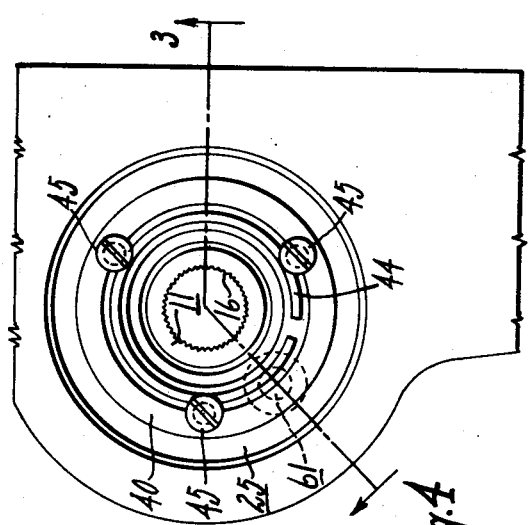
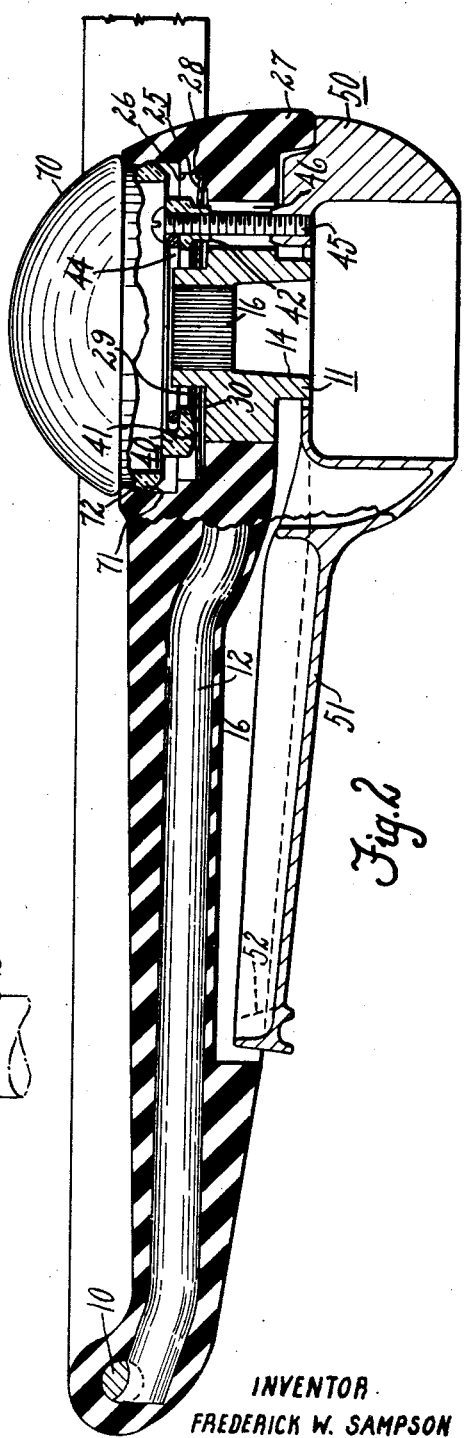
INVENTOR.
FREDERICK W. SAMPSON
BY Spencer Hardman & Jahr
HIS ATTORNEYS

Patented June 5, 1951

2,555,510

UNITED STATES PATENT OFFICE 2,555,510

STEERING WHEEL HAVING BUILT-IN ELECTRIC SWITCH

Frederick W. Sampson, Dayton, Ohio, assignor to General Motors Corporation, Detroit, Mich., a corporation of Delaware Application May 28, 1949, Serial No. 95,957

4 Claims. (Cl. 200—59)

This invention relates to an electric switch, such as a horn blowing switch, built into the body of a steering wheel for an automotive vehicle.

An object of this invention is to provide a steering wheel having an electric switch built therein having as the insulated movable contact member a flexible dished annular metal spring mounted closely adjacent the grounded metal hub of the steering wheel and distortable in an axial direction to make electric contact with said hub to complete an electric circuit.

Important advantages result from the use of such a flexible annular metal spring, for example: (1) The inner periphery of the annular spring is readily flexed into contact with said hub at any point around the periphery of said spring, hence the switch can be closed by depressing any point of said inner periphery around the full circle thereof. (2) The annular dished spring is a simple strong and rugged type of spring which requires a minimum vertical or head-room space and can be very simply mounted within the steering wheel hub in insulated relation therewith. (3) The metal hub itself serves as one switch contact member and this simple rugged construction eliminates danger of failure due to wear or sparking at the switch contact areas. (4) The force necessary to close the switch may be readily adjusted to give a stiffer or weaker spring by a very slight adjustment of the axial compression which retains the dished spring partly flattened out at all times. (5) Due to the force-deflection characteristics of the slightly dished spring the manual force required to maintain the switch closed will ordinarily be somewhat less than that required to close the switch from its full open position.

Further objects and advantages of the present invention will be apparent from the following description, reference being had to the accompanying drawings wherein a preferred embodiment of the present invention is clearly shown.

In the drawings:

Fig. 2 is a vertical section taken on line 2—2 of Fig. 1.

Fig. 3 is a vertical section taken on line 3—3 of Fig. 1 or Fig. 4.

Fig. 4 is an enlarged plan view of the central portion of Fig. 1.

Fig. 6 is a face view of the spring, and Fig. 7 is a section taken on line 7—7 of Fig. 6.

Fig. 8 is a face view of said actuating ring, and Fig. 9 is a section taken on line 9—9 of Fig. 8.

Similar reference characters refer to similar parts thruout the drawings.

Figure 7:
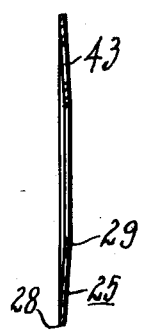
Figs. 6 and 7 are detailed views of the slightly dished annular spring which is an essential part of the invention.

The steering wheel chosen for illustration with this invention is a two-spoke molded steering wheel having a reinforcing metal skeleton insert embedded within the molded material forming the body of the wheel. This metal skeleton comprises a metal rim insert 10, a central metal hub portion 11, and a metal spoke insert 12 having its two opposite ends welded to rim insert 10 (as shown at the left of Fig. 2) and having its central portion strongly welded within a suitable notch cut in the periphery of the metal hub portion 11 at the location 13 in Fig. 1, thereby forming a complete one-piece metal skeleton which provides the main strength of the steering wheel.

Hub portion 11 has a tapered recess 14 adapted to fit snugly over a correspondingly tapered portion of the steering shaft 15 shown in outline by dot-dash lines in Fig. 3. Hub portion 11 has a splined central hole 16 by means of which said hub 11 is splined to the upper end of steering shaft 15 to properly carry the steering torque. The upper end of steering shaft 15 extends thru the splined hole 16 in hub 11 and has a holddown nut on its upper projecting end to rigidly fix hub 11 to steering shaft 15. Such a holddown nut is the customary well-known construction and is not illustrated in Fig. 3 for clearer illustration of the essential parts of this invention.

Figure 6:
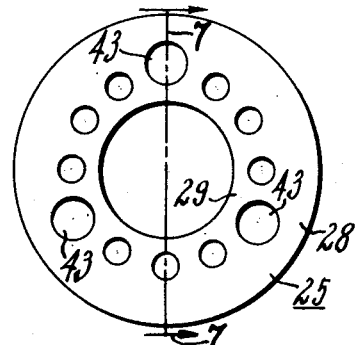

The horn-blowing switch of this invention will now be described. The slightly dished flexible annular spring 25, shown in Figs. 6 and 7, is located within a suitable recess 26 in the molded hub portion 27 of electrically insulating molded material so that the outer periphery 28 of said annular spring 25 rests upon and is supported by said insulating molded material, and so that its inner periphery 29 overlies but is normally slightly spaced above the metal surface 30 of the metal hub portion 11. The closing of the electric switch of this invention is accomplished simply by flexing any portion of said inner periphery so as to depress it into metal to metal contact with said hub surface 30, which thereby grounds and so completes the live circuit suitably connected to the electrically insulated annular spring 25.

Figure 8:
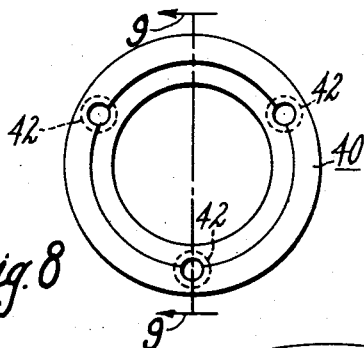
Figs. 8 and 9 are detail views of the actuating ring which rests directly upon and flexes the dished annular spring.
Figure 9:
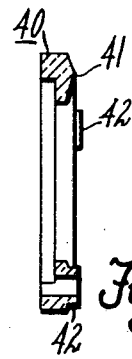

The illustrated means for so depressing a portion of said inner periphery 29 will now be described. A molded actuating ring 40 of insulating material, as shown in detail in Figs. 8 and 9, bears directly upon said annular spring 25 at the circular fulcrum 41 which has a materially smaller diameter and hence is offset radially inwardly from the supported outer periphery 28 of said annular spring 25. Ring 40 is preferably provided with three small depending lugs 42 which fit loosely within corresponding holes 43 in spring 25 in order to retain ring 40 and spring 25 in correct cooperating relationship. Ring 40 is rigidly fixed to a manually tiltable switch actuating member 50, which underlies the steering wheel, by means of three through screws 45 which extend downwardly thru central holes in the three lugs 42 and thru three clearance holes 46 provided therefor in the wheel hub. Actuating member 50 is held up against the under side of the molded portion of the wheel hub by said thru screws 45. Hence by tightening up on screws 45 the annular spring 25 may be flattened out to the desired degree by the downward pressure thereupon by the fulcrum 41 of ring 40. In this way the desired operating tension on spring 25 may be readily adjusted in a very simple manner. Preferably screws 45 are retained in their adjusted positions by the outwardly expanding pressure of a circular wire spring 44 which can be readily snapped into place under the heads of said screws 45 (see Figs. 2 and 4).

Figure 5:
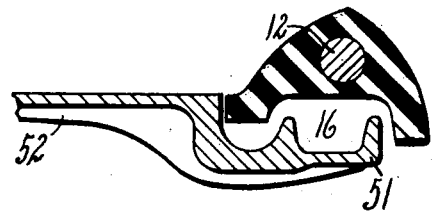
Fig. 5 is a section on line 5—5 of Fig. 1 and shows the juxtaposition of the manually operated member with steering wheel spoke.
Figure 1:
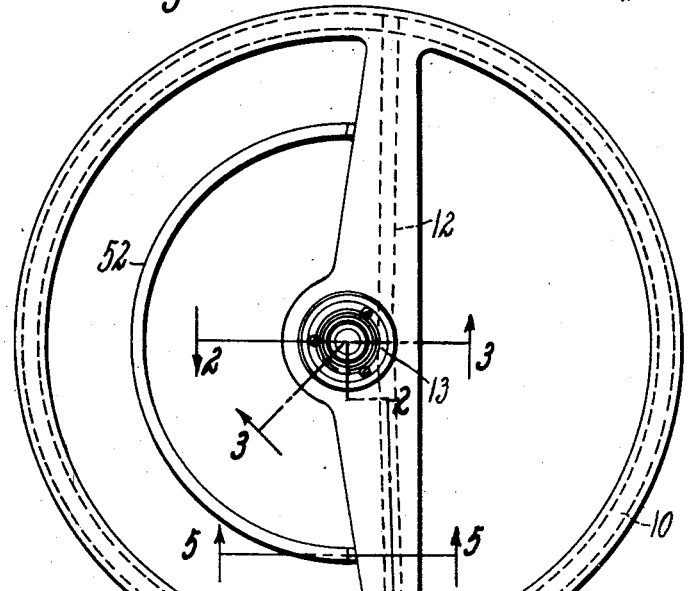
Fig. 1 is a plan view of an automotive steering wheel embodying the electric switch of this invention, but with the detachable hub cover removed.

The tiltable switch-actuating member 50 here illustrated is a die casting of substantial size and is shaped to give the appearance of constituting a rounded lower part of the steering wheel hub. Member 50 has two opposed integral arms 51 each underlying one of the steering wheel spokes and preferably partly located in a longitudinal recess 16 provided therefor. However said arms 51 are spaced from said spokes to provide for the required tilting movement of said arms 51 relative to said spokes, as clearly shown in Figs. 2 and 5. The ends of the two arms 51 are connected by an integral manually actuated ring 52 by means of which the entire member 50 together with switch-actuating ring 40 may be manually tilted in any direction simply by depressing ring 52 at any point around its periphery. If so desired, ring 52 may extend around both sides of the wheel instead of around only the left side of the wheel as shown in Fig. 1, that is, the ends of the two arms 51 may also be similarly connected with a manually-actuated member on the opposite side of the hub from ring 52 as viewed in Fig. 1.

It will be clear from the above description that the annular dished spring 25 is electrically insulated from the metal hub portion 11 so long as its inner periphery 29 is slightly spaced out of contact with surface 30 of said hub portion 11. The means for electrically connecting spring 25 to the live wire 59 of the horn circuit (or other circuit) to be closed by the switch will now be described. An electrically insulated stationary flanged metal ring 60, shown in dot-dash lines in Fig. 3, is suitably fixed to the usual stationary housing commonly termed the mast jacket (not shown) which surrounds and conceals the steering shaft 15. A brush cartridge unit 61 which is mounted in and rotates with the steering wheel electrically connects ring 60 to the annular spring 25 in all positions of the rotatable steering wheel. Cartridge unit 61 comprises an insulating sleeve 62 inserted thru a hole provided therefor thru the steering wheel hub as clearly shown in Fig. 3. Member 50 is also cut away as shown at 58 in Fig. 3 to provide suitable clearance for unit 61. Slideably retained in sleeve 62 are metal contact element 63, the sliding brush 64, and a small coil compression spring 65 which electrically connects contact element 63 to brush 64 and urges these two to slide outwardly from sleeve 62. Thus contact element 63 will at all times make good electrical contact with the under surface of annular spring 25, and brush 64 will be yieldably urged into good electrical contact with the stationary ring 60 as it slides thereupon with the rotation of the steering wheel. Stationary ring 60 is connected to the insulated wire lead 59 which forms part of the horn-blowing circuit which is to be closed by the switch. It will now be clear that the insulated annular spring 25 is at all times connected to the live side of the electric circuit and that this circuit will be closed whenever the inner periphery 29 of annular spring 25 is flexed into contact with surface 30 of the grounded metal hub 11, assuming of course that the return wire of the electric circuit is also grounded to steering shaft 15 in the usual manner.

A detachable molded hub cover 70 covers the central opening of the steering wheel hub. This cover 70 is here shown as being retained in place by a small bead 71 thereon which yieldably snaps under the slight shoulder 72 in the central opening of the molded hub portion when said cover 70 is pressed into place. However any other suitable form of a detachable cover for the central opening in the steering wheel hub may obviously be used if so desired, since the detachable hub cover merely conceals the underlying functional parts.

In operation, whenever the manually actuated ring 52 is depressed at any point around its circular extent the entire member 50 together with its rigidly attached ring 40 is correspondingly tilted. Any tilting movement of ring 40 from its normal switch-open position (shown in Figs. 2 and 3) will cause fulcrum 41 thereof to flex some portion of the inner periphery 29 of annular spring 25 into electrical contact with surface 30 of metal hub 11 and thereby close the switch. Also whenever ring 52 is lifted at any point thereof by the operator the entire member 50 together with ring 40 is correspondingly tilted to close the switch in a similar manner.

While the embodiment of the present invention as herein disclosed, constitutes a preferred form, it is to be understood that other forms might be adopted.

What is claimed is as follows:

1. In a vehicle steering wheel having a metal hub for fixing same to a steering shaft and a non-metallic molded covering around said metal hub, an electric switch comprising: an annular metal spring having continuous inner and outer peripheries mounted upon said steering wheel and having its outer periphery supported by said molded covering so as to be electrically insulated from said metal hub, said annular spring having its inner periphery projecting inwardly above and narrowly spaced from said metal hub and yieldably depressible by a warping distortion of said annular spring into electric contact therewith to complete an electric circuit, and a manually tiltable ring overlying said annular spring and tiltable in any direction to depress some portion of said inner periphery into electric contact with said metal hub.

2. In a steering wheel having a metal hub portion, a substantially flat but slightly dished metal annular spring insulatedly mounted immediately above said metal hub portion and having its inner periphery projecting inwardly above and closely spaced from said hub portion, various portions of the inner periphery of said annular spring being movable by a warping distortion of said annular spring into electric contact with said hub portion to complete an electric circuit, an actuating ring concentric with and retained in pressure contact upon the upper surface of said annular spring, and manually operated lever means for tilting said actuating ring in various directions for distorting various portions of said inner periphery into electric contact with said hub portion to complete an electric circuit.

3. In a steering wheel having a metal hub portion, a substantially flat but slightly dished metal annular spring insulatedly and fixedly mounted above said metal hub portion and having its inner periphery closely spaced from said hub portion, any portion of the inner periphery of said annular spring being yieldably depressible by a warping distortion of said spring into electric contact with said metal hub portion to complete an electric circuit, and a manually tiltable actuating ring held constantly pressed upon the upper surface of said annular spring so as to at least partially flatten out said spring with an initial load thereupon, said actuating ring being manually tiltable in various directions to depress some portion of the inner periphery of said annular spring into contact with said metal hub portion regardless of which direction said actuating ring is tilted.

4. The device of claim 2 wherein said manually operated lever means is mounted below said metal hub portion and is substantially rigidly connected to said actuating ring overlying said annular spring by fastening means passing thru apertures in said spring.

FREDERICK W. SAMPSON.

REFERENCES CITED

The following references are of record in the file of this patent:

UNITED STATES PATENTS

| Number | Name | Date |
| --- | --- | --- |
| 1,738,755 | Blackmore | Dec. 10, 1929 |
| 1,988,345 | Vaughn | Jan. 15, 1935 |
| 2,221,409 | Phelps et al. | Nov. 12, 1940 |
| 2,235,069 | Geyer | Mar. 18, 1941 |
| 2,237,055 | Little | Apr. 1, 1941 |
| 2,286,016 | Sladky | June 9, 1942 |
| 2,355,951 | Coffeen et al. | Aug. 15, 1944 |
| 2,454,242 | Wharam et al. | Nov. 16, 1948 |